United States Patent
Kwon et al.

(10) Patent No.: US 7,649,578 B2
(45) Date of Patent: Jan. 19, 2010

(54) ARRAY SUBSTRATE AND DISPLAY PANEL HAVING THE SAME WITH PARTICULAR SENSOR ELECTRODES

(75) Inventors: Sun-ja Kwon, Gunpo-si (KR); Kee-han Uh, Yongin-si (KR); Min-kyung Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 171 days.

(21) Appl. No.: 12/017,835

(22) Filed: Jan. 22, 2008

(65) Prior Publication Data

US 2008/0174706 A1 Jul. 24, 2008

(30) Foreign Application Priority Data

Jan. 22, 2007 (KR) .................. 10-2007-0006406

(51) Int. Cl.
*G02F 1/1335* (2006.01)
*G02F 1/1333* (2006.01)
*G06F 3/045* (2006.01)

(52) U.S. Cl. .................... 349/12; 349/158; 345/174

(58) Field of Classification Search .............. 349/12, 349/158; 345/173, 174, 175
See application file for complete search history.

(56) References Cited

U.S. PATENT DOCUMENTS

| | | | | |
|---|---|---|---|---|
| 6,028,581 | A * | 2/2000 | Umeya | 345/104 |
| 6,501,529 | B1 | 12/2002 | Kurihara et al. | |
| 7,148,487 | B2 * | 12/2006 | Ishii et al. | 250/370.14 |
| 2006/0109222 | A1 * | 5/2006 | Lee et al. | 345/88 |
| 2006/0146038 | A1 * | 7/2006 | Park et al. | 345/173 |
| 2008/0018613 | A1 * | 1/2008 | Kim et al. | 345/173 |
| 2009/0091698 | A1 * | 4/2009 | Cho | 349/139 |

FOREIGN PATENT DOCUMENTS

| | | |
|---|---|---|
| FR | 2879763 A1 | 6/2006 |
| JP | 2000-099268 | 4/2000 |
| JP | 2001-075074 | 3/2001 |
| KR | 1020060056633 A | 5/2006 |

OTHER PUBLICATIONS

European Search Report dated Feb. 27, 2009, corresponding to European Patent Application No. 08000837.8-1228/1947504.

\* cited by examiner

*Primary Examiner*—Mike Qi
(74) *Attorney, Agent, or Firm*—Cantor Colburn LLP

(57) ABSTRACT

An array substrate includes a gate line, a data line, a thin-film transistor (TFT), a pixel electrode, a first sensor line, a second sensor line and a sensor electrode part. The TFT is electrically connected to the gate and data lines. The pixel electrode is formed in a unit area defined by the gate and data lines. The pixel electrode is electrically connected to the TFT. The first sensor line is substantially parallel with the gate line. The second sensor line is substantially parallel with the data line. The sensor electrode part is formed in the unit area and electrically connected to the first and second sensor lines. The sensor electrode part is adjacent to the pixel electrode in a large axis direction of the unit area.

28 Claims, 7 Drawing Sheets

ARRAY SUBSTRATE AND DISPLAY PANEL HAVING THE SAME WITH PARTICULAR SENSOR ELECTRODES

This application claims priority to Korean Patent Application No. 2007-0006406, filed on Jan. 22, 2007, and all the benefits accruing therefrom under 35 U.S.C. §119, the contents of which in its entirety are herein incorporated by reference.

BACKGROUND OF THE INVENTION

1. Field of the Invention

The present invention relates to an array substrate and a display panel having the array substrate. More particularly, the present invention relates to an array substrate capable of enhancing an aperture ratio thereof, and a display panel having the array substrate.

2. Description of the Related Art

Liquid crystal display ("LCD") devices are known to have characteristics, such as lightweight, lower power consumption, lower driving voltage, etc., in comparison with other display apparatuses, rendering them useful in monitors, notebook computers, cellular phones, etc. The LCD device includes an LCD panel displaying images using a light transmitting ratio of liquid crystal molecules and a backlight assembly disposed below the LCD panel to provide the LCD panel with light.

The LCD panel includes an array substrate, an opposite substrate and a liquid crystal layer. The array substrate includes a signal line, a thin-film transistor ("TFT"), and a pixel electrode. The opposite substrate faces the array substrate and includes a common electrode. The liquid crystal layer is interposed between the array substrate and the opposite substrate.

The LCD panel may have a touch panel function capable of receiving a position datum through an external pressure. That is, when an electronic pen or a finger touches a screen of the LCD panel, a position datum signal may be applied to a central processing unit ("CPU") of a main system.

The LCD panel further includes a sensor line and a sensor electrode part to perform the touch panel function. Particularly, the sensor line is formed on the array substrate and is spaced apart from the signal line, and the sensor electrode part is formed in a unit pixel to be electrically connected to the signal line. When the common electrode makes contact with the sensor electrode part by applying an external pressure to the opposite substrate, a position datum corresponding to the contact position is provided to the CPU through the sensor line to perform an operation.

However, when the sensor electrode part is formed in the unit pixel, an aperture ratio of the LCD panel is decreased by the size of the sensor electrode part, which causes a decrease in luminance. By contrast, when the size of the sensor electrode part is decreased so as to increase a luminance, electrical contact between the sensor electrode part and a common electrode of the opposite substrate becomes more difficult.

BRIEF SUMMARY OF THE INVENTION

An exemplary embodiment of the present invention provides an array substrate capable of increasing an aperture ratio by changing a position of a sensor electrode part.

Another exemplary embodiment of the present invention also provides a display panel having the array substrate.

In one aspect of the present invention, an array substrate includes a gate line, a data line, a thin-film transistor (TFT), a pixel electrode, a first sensor line, a second sensor line and a sensor electrode part. The gate line is formed in a first direction. The data line is formed in a second direction crossing the first direction. The TFT is electrically connected to the gate and data lines. The pixel electrode is formed in a unit area defined by the gate and data lines. The pixel electrode is electrically connected to the TFT. The first sensor line is substantially parallel with the gate line. The second sensor line is substantially parallel with the data line. The sensor electrode part is formed in the unit area to be electrically connected to the first and second sensor lines. The sensor electrode part is adjacent to the pixel electrode in a large axis direction of the unit area.

In another aspect of the present invention, a display panel includes an array substrate, an opposite substrate and a liquid crystal layer. The opposite substrate faces the array substrate. The liquid crystal layer is interposed between the array substrate and the opposite substrate. The array substrate includes a gate line, a data line, a thin-film transistor (TFT), a pixel electrode, a first sensor line, a second sensor line and a sensor electrode part. The gate line is formed in a first direction. The data line is formed in a second direction crossing the first direction. The TFT is electrically connected to the gate and data lines. The pixel electrode is formed in a unit area defined by the gate and data lines. The pixel electrode is electrically connected to the TFT. The first sensor line is substantially parallel with the gate line. The second sensor line is substantially parallel with the data line. The sensor electrode part is formed in the unit area to be electrically connected to the first and second sensor lines. The sensor electrode part is adjacent to the pixel electrode in a large axis direction of the unit area.

In still another aspect of the present invention, an array substrate includes a gate line, a data line, a thin-film transistor (TFT), a pixel electrode, a first sensor line, a second sensor line and a sensor electrode part. The gate line is formed in a first direction. The data line is formed in a second direction crossing the first direction. The TFT is electrically connected to the gate and data lines. The pixel electrode is formed in a unit area defined by the gate and data lines. The pixel electrode is electrically connected to the TFT. The first sensor line is substantially parallel with the gate line. The second sensor line is substantially parallel with the data line. The sensor electrode part is formed at an intersecting region of the first and second sensor lines of the unit area. The sensor electrode part is electrically connected to the first and second sensor lines.

In further still another aspect of the present invention, a display panel includes an array substrate, an opposite substrate and a liquid crystal layer. The opposite substrate faces the array substrate. The liquid crystal layer is interposed between the array substrate and the opposite substrate. The array substrate includes a gate line, a data line, a thin-film transistor (TFT), a pixel electrode, a first sensor line, a second sensor line and a sensor electrode part. The gate line is formed in a first direction. The data line is formed in a second direction crossing the first direction. The TFT is electrically connected to the gate and data lines. The pixel electrode is formed in a unit area defined by the gate and data lines. The pixel electrode is electrically connected to the TFT. The first sensor line is substantially parallel with the gate line. The second sensor line is substantially parallel with the data line. The sensor electrode part is formed at an intersecting region of the first and second sensor lines of the unit area. The sensor electrode part is electrically connected to the first and second sensor lines.

According to the present invention, the sensor electrode part is formed adjacent to the pixel electrode in a large axis direction of the unit area, and the first and second sensor dummy electrodes are formed corresponding with the first and second sensor protrusion electrodes, such that a stepped portion in the sensor electrode part is not generated, thereby minimizing a size of the sensor electrode part. As a result, an aperture ratio of the display panel may be increased.

BRIEF DESCRIPTION OF THE DRAWINGS

The above and other aspects, features, and advantages of the present invention will become readily apparent by reference to the following detailed description when considered in conjunction with the accompanying drawings wherein.

DETAILED DESCRIPTION OF THE INVENTION

Figure 1:
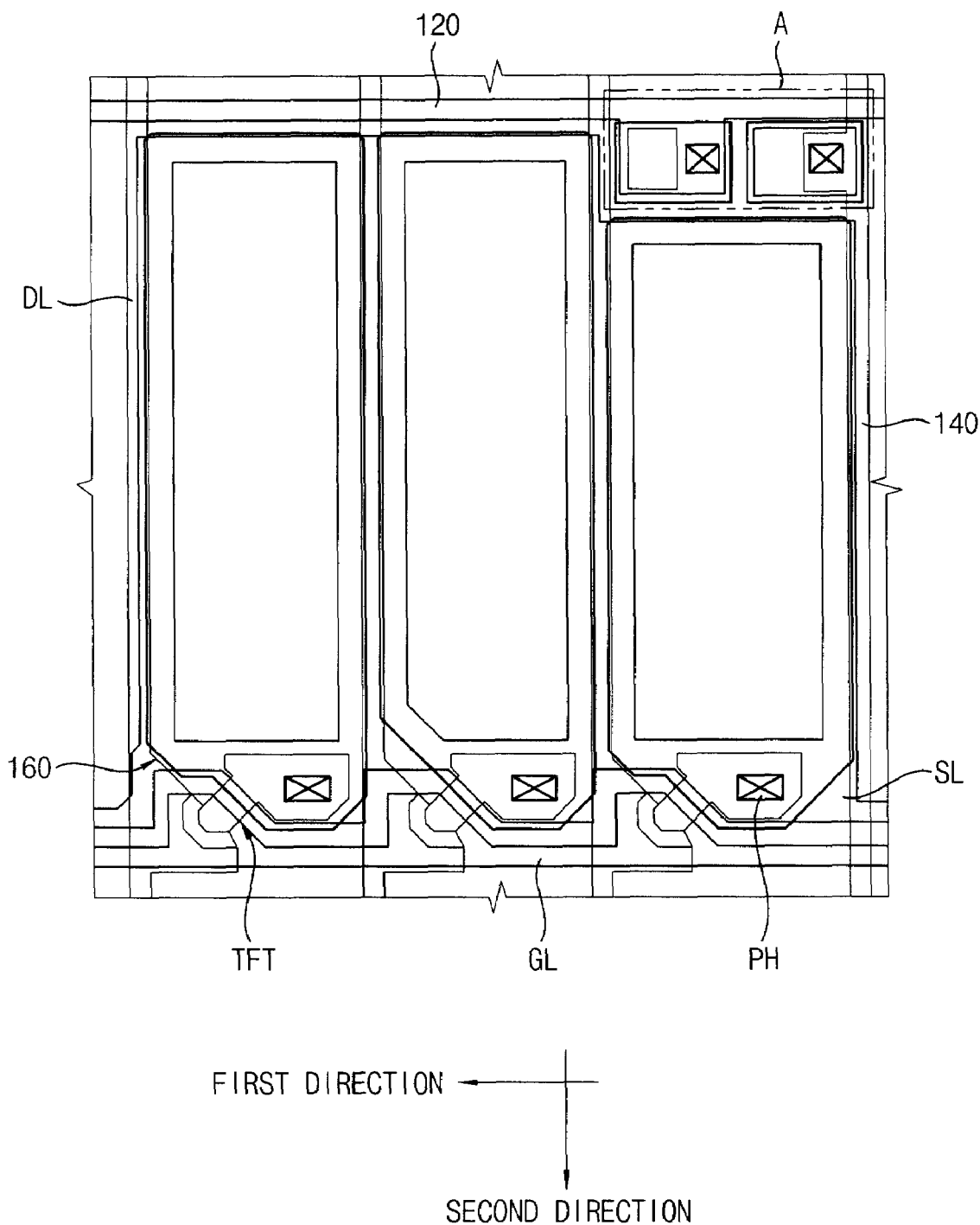
FIG. 1 is a plan view layout showing a portion of a display panel according to an exemplary embodiment of the present invention.

The invention now will be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, the exemplary embodiments of the present invention will be described in detail with reference to the accompanying drawings.

Figure 2:
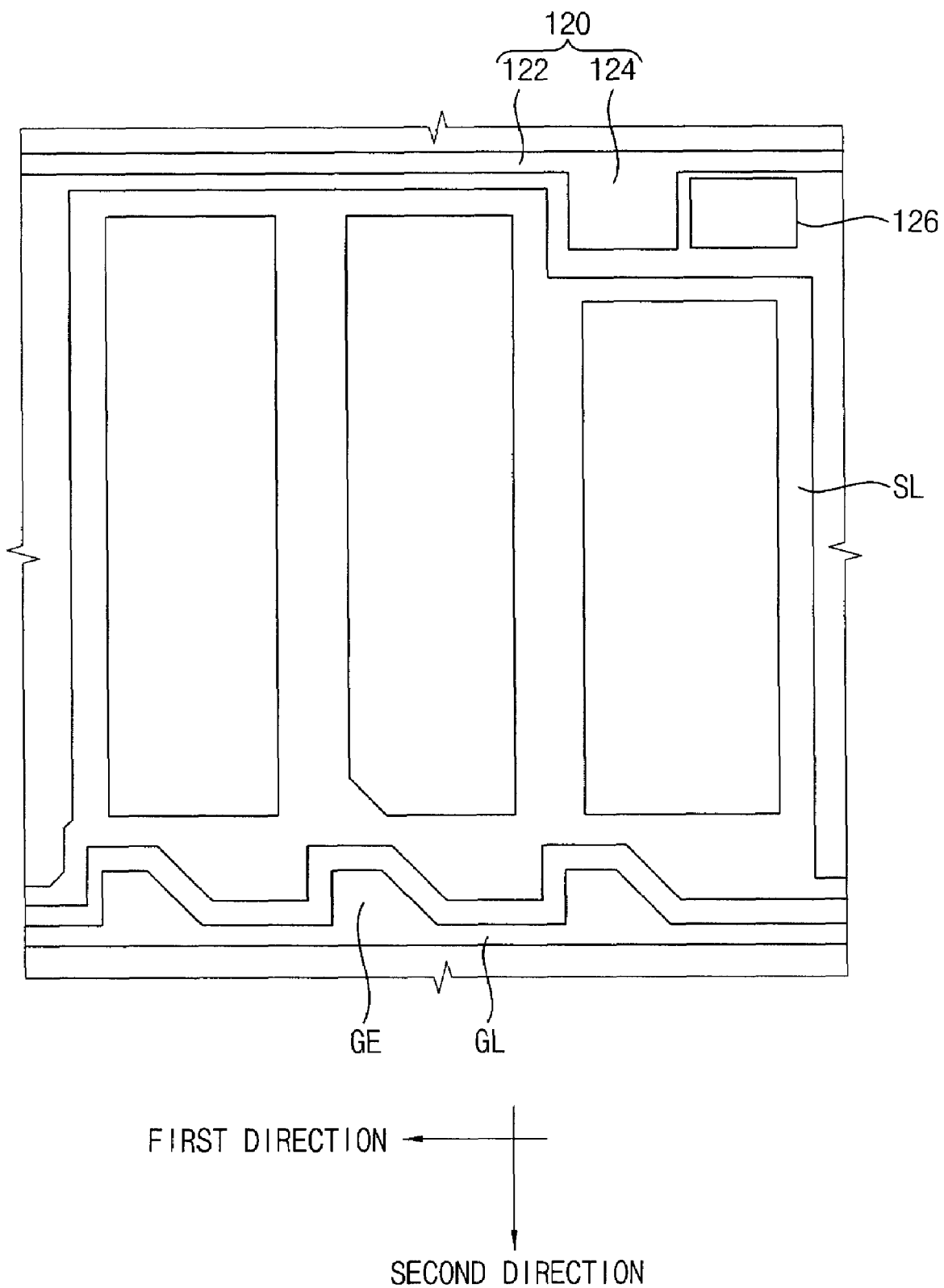
FIG. 2 is a plan view layout showing a gate line, a storage line, a first sensor line and a first sensor dummy electrode of FIG. 1.
Figure 3:
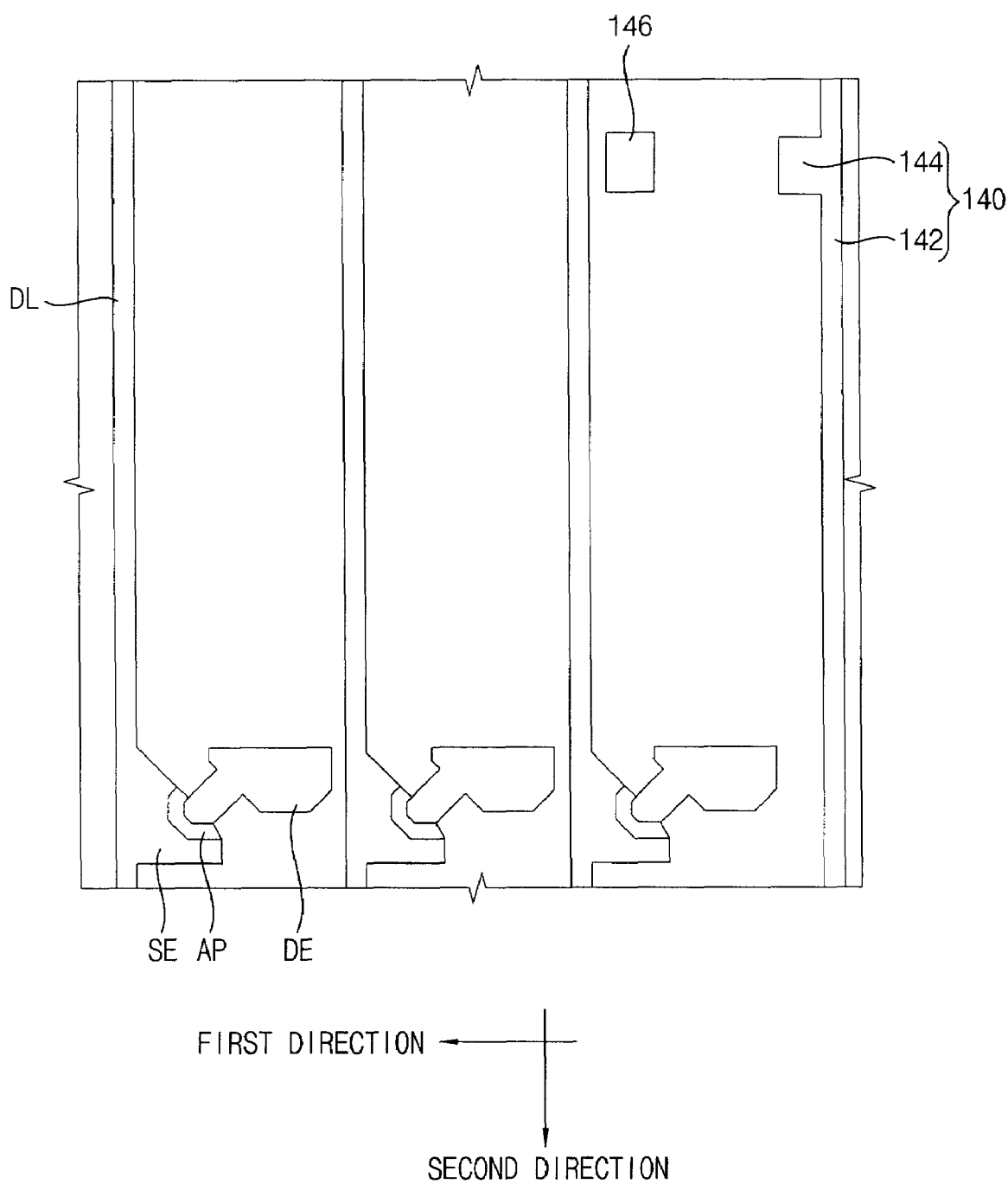
FIG. 3 is a plan view layout showing a data line, an activation pattern, a drain electrode, a second sensor line and a second sensor dummy electrode of FIG. 1.
Figure 4:
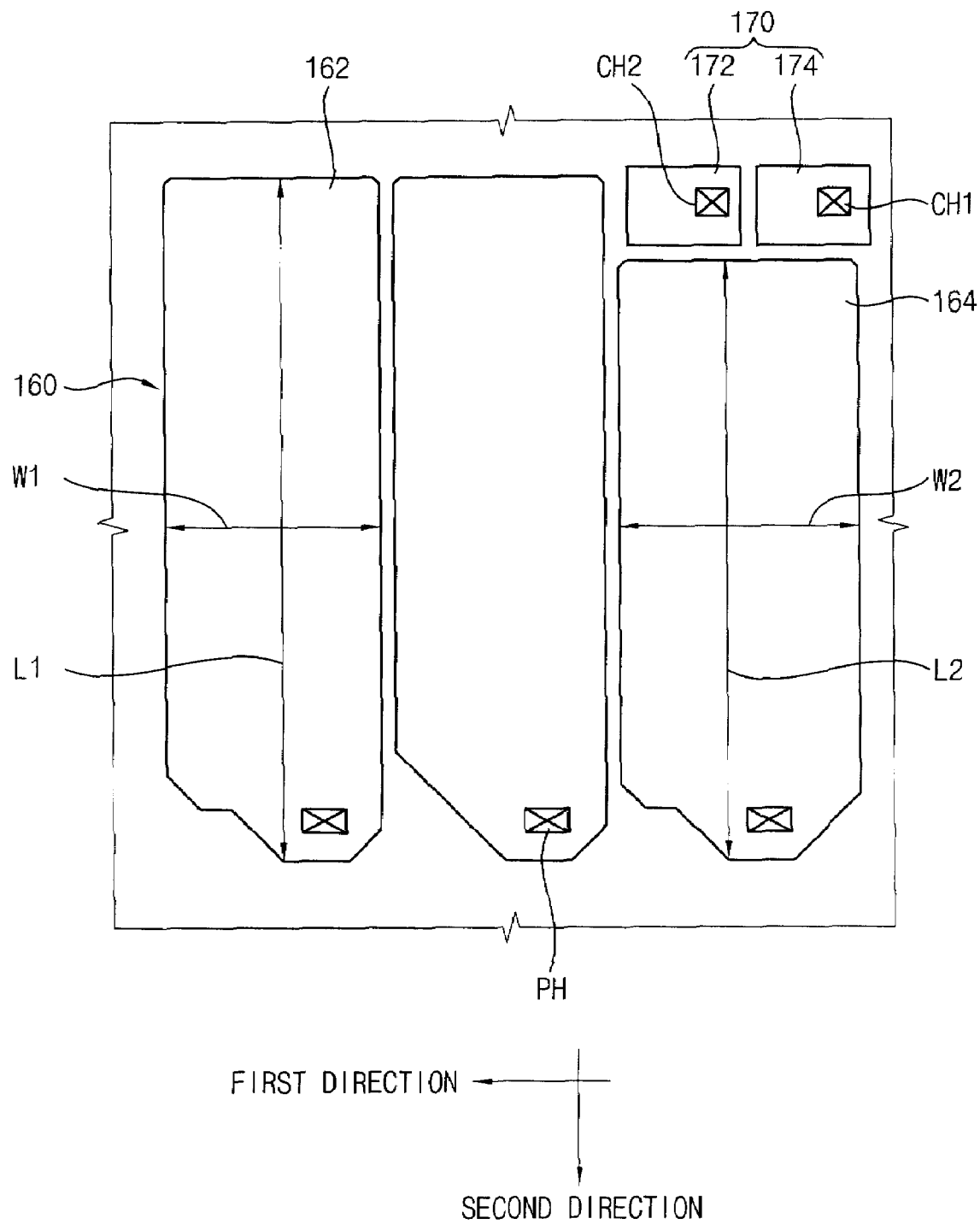
FIG. 4 is a plan view layout showing pixel electrodes of FIG. 1.
Figure 5:
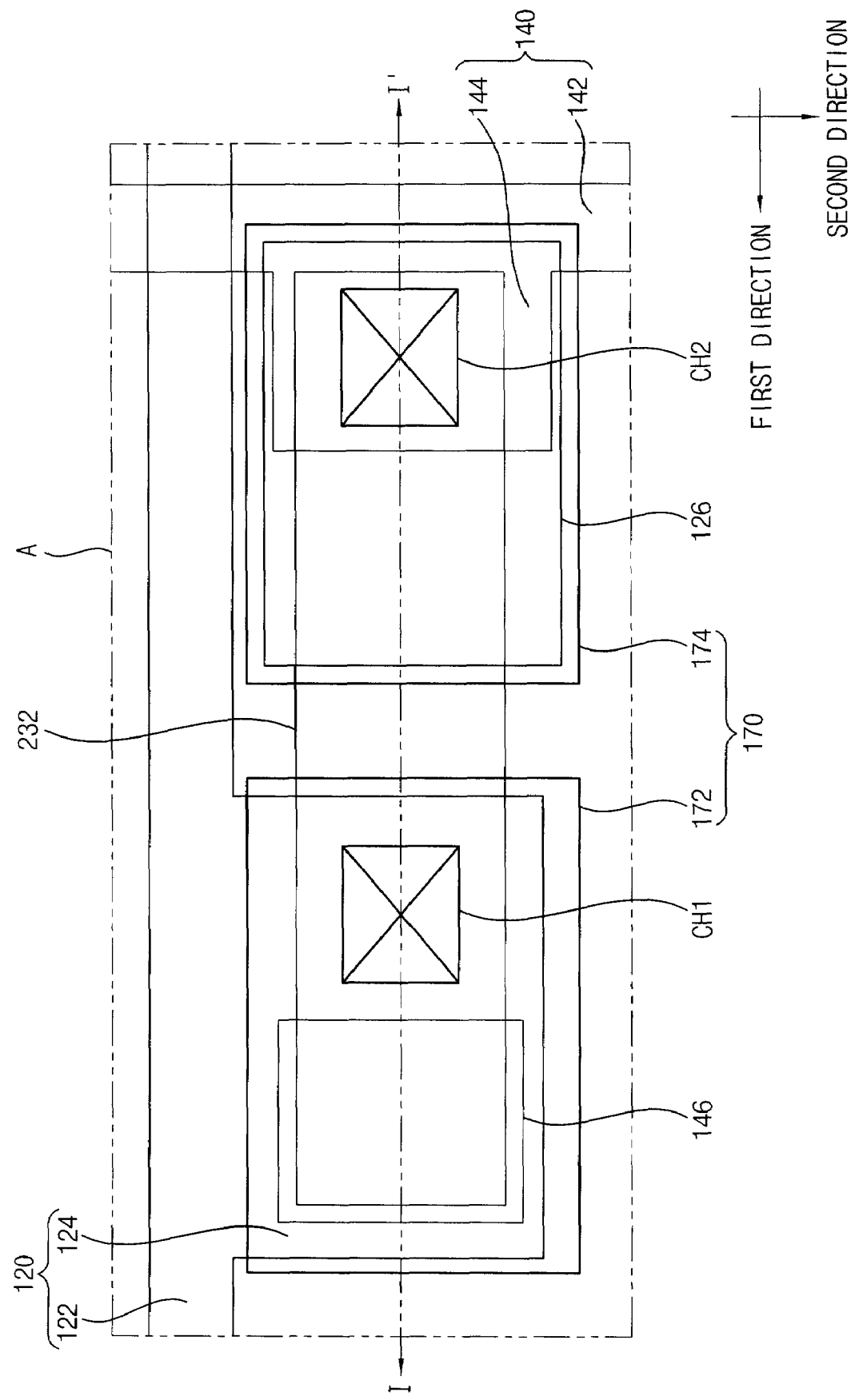
FIG. 5 is an enlarged plan view showing a portion "A" of FIG. 1.
Figure 6:
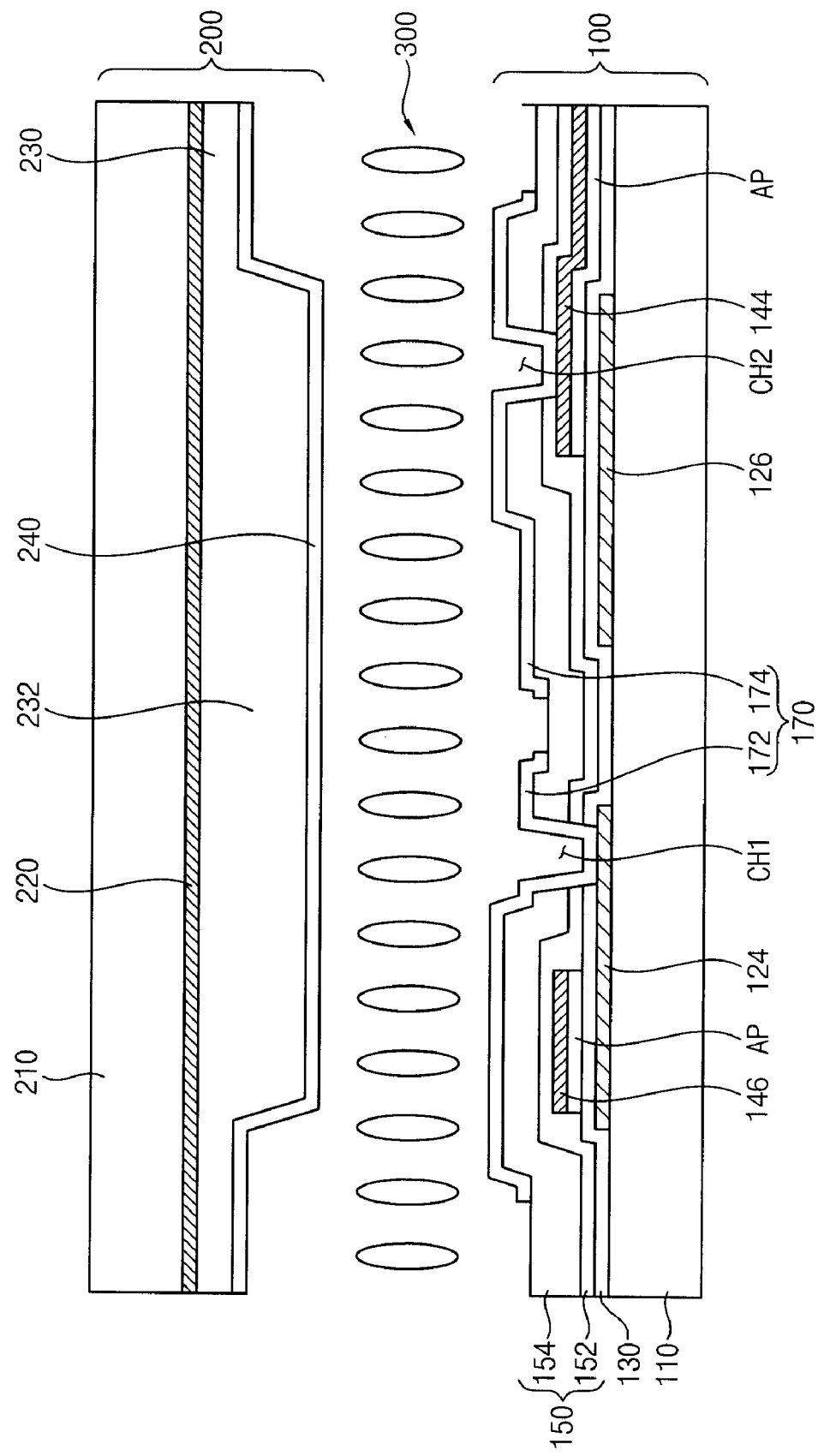
FIG. 6 is a cross-sectional view taken along the line I-I' of FIG. 5.

FIG. 1 is a plan view layout showing a portion of a display panel according to an exemplary embodiment of the present invention. FIG. 2 is a plan view layout showing a gate line, a storage line, a first sensor line, and a first sensor dummy electrode of FIG. 1. FIG. 3 is a plan view layout showing a data line, an activation pattern, a drain electrode, a second sensor line, and a second sensor dummy electrode of FIG. 1. FIG. 4 is a plan view layout showing pixel electrodes of FIG. 1. FIG. 5 is an enlarged plan view showing a portion "A" of FIG. 1. FIG. 6 is a cross-sectional view taken along the line I-I' of FIG. 5.

Referring to FIGS. 1 to 6, a display panel according to an exemplary embodiment of the present invention includes an array substrate 100, an opposite substrate 200 and a liquid crystal layer 300. The display panel displays images.

The array substrate 100 includes, for example, a plurality of pixel electrodes 160 arranged in a matrix shape, a plurality of thin-film transistors (TFTs) electrically connected to the pixel electrodes 160 and a plurality of signal lines electrically connected to the TFT.

The opposite substrate 200 is disposed to face the array substrate 100. The opposite substrate 200 may include a light-blocking layer 220 blocking light, a plurality of color filters (not shown) corresponding to the pixel electrodes 160, and a common electrode 240 receiving a common voltage.

The liquid crystal layer 300 is interposed between the array substrate 100 and the opposite substrate 200, and rearranged by an electric field formed between the array substrate 100 and the opposite substrate 200. Thus configured, when an electric field is applied to the liquid crystal layer 300, an arrangement of liquid crystal molecules of the liquid crystal layer 300 is altered to change optical transmissivity, so that an image is displayed.

The array substrate 100 according to an exemplary embodiment of the present invention will be described.

The array substrate 100 includes a first base substrate 110, a gate line GL, a storage line SL, a first sensor line 120, a first sensor dummy electrode 126, a gate insulation layer 130, a data line DL, a thin-film transistor (TFT), a second sensor line 140, a second sensor dummy electrode 146, a protection layer 150, a pixel electrode 160 and a sensor electrode part 170.

The first base substrate 110 may be formed to have a plate shape. The first base substrate 110 may be formed from, for example, glass, quartz, synthetic resin, etc.

Referring to FIGS. 1, 2, 5 and 6, a plurality of gate lines GLs may be formed on the first base substrate 110 in a first direction. The storage line SL is spaced apart from the gate line GL. The storage line SL may be overlapped with an end portion of a pixel electrode 160, which is described below.

The first sensor line 120 formed in substantially parallel with the gate line GL (i.e., in the first direction) is spaced apart from both the gate line GL and storage line SL. A plurality of first sensor lines 120 may be formed in the first direction.

The first sensor line 120 may be formed in predetermined numbers that correspond to one or more gate lines GLs. For example, a first sensor line 120 may be formed for every six gate lines GLs in sequence.

The first sensor line 120 includes a first sensor main line 122 formed in the first direction, and a first sensor protrusion electrode 124 that is protruded from the first sensor main line 122 toward a second direction extending away from the first sensor main line 122. That is, the first sensor protrusion electrode 124 may be protruded from the first sensor main line 122 toward the second direction when viewed in a plan view layout. The second direction may be substantially perpendicular to the first direction.

The first sensor dummy electrode 126 is formed on the first base substrate 110 to be spaced apart from the first sensor line 120 and the storage line SL. For example, the first sensor dummy electrode 126 is formed substantially parallel with the first sensor main line 122, and is adjacent to, and spaced apart from, the first sensor protrusion electrode 124. The first sensor dummy electrode 126 may be formed to have, e.g., a substantially square or rectangular shape. If rectangular in shape, the length may extend in the first direction.

The gate insulation layer 130 is formed on the first base substrate 110 to cover the gate line GL, the storage line SL, the first sensor line 120 and the first sensor dummy electrode 126. The gate insulation layer 130 may include an inorganic insulation. For example, the gate insulation layer 130 may include a silicon nitride (SiNx) layer and a silicon oxide (SiOx) layer.

Referring to FIGS. 1, 2, 3, 5 and 6, a plurality of the data lines DLs may be formed on the gate insulation layer 130 in the second direction. The gate lines GLs and the data lines DLs are formed to define a plurality of unit areas in the array substrate 100. Each of the unit areas may form a rectangular shape that extends longer in the second direction than it extends in the first direction.

The second sensor line 140 is spaced apart from the data line DL and is substantially parallel with the data line DL (i.e., in the second direction). A plurality of the second sensor lines 140 may be formed in the second direction.

The second sensor line 140 may be formed in predetermined numbers that correspond to one or more data lines DLs. For example, a second sensor line 140 may be formed for every six data lines DLs in sequence.

The second sensor line 140 includes a second sensor main line 142 formed in the second direction, and a second sensor protrusion electrode 144 that is protruded from the second sensor main line 142 toward the first direction extending away from the second sensor main line 142. That is, the second sensor protrusion electrode 144 may be protruded from the second sensor main line 142 toward the first direction when viewed from a plan view.

The second sensor dummy electrode 146 is formed on the gate insulation layer 130 to be spaced apart from the second sensor line 140 and the data line DL. For example, the second sensor dummy electrode 146 is spaced apart from, and substantially aligned with, the second sensor protrusion electrode 144 in the first direction.

The TFT is formed in each of the unit areas defined by the gate and data lines, respectively, and electrically connected to the gate line GL and the data line DL. The TFT includes a gate electrode GE, an activation pattern AP, a source electrode SE and a drain electrode DE.

The gate electrode GE may be extended from the gate line GL toward the first sensor line 120. The activation pattern AP is formed on the gate insulation layer 130 to be overlapped with the gate electrode GE. The source electrode SE is extended from the data line DL toward the gate electrode GE, and is overlapped with the activation pattern AP. The drain electrode DE is spaced apart from the source electrode SE to be overlapped with the activation pattern AP, and extends away from the source electrode SE to be overlapped with a pixel electrode 160 as described below.

In the present exemplary embodiment, the TFT may be formed through a four-masking process, so that the activation pattern AP may be formed below the data line DL. That is, the activation pattern AP may be formed on the gate insulation layer 130, and the data line DL may be formed on the activation pattern AP.

The protection layer 150 is formed on the gate insulation layer 130 to cover the data line DL, the second sensor line 140 and the TFT. The protection layer 150 may include a single layer structure. Alternatively, the protection layer 150 may include a double layer structure. For example, the protection layer 150 may include an inorganic protection layer 152 covering the data line DL, the second sensor line 140 and the TFT, and an organic protection layer 154 formed on the inorganic insulation layer 152. Here, a thickness of the organic protection layer 154 may be thicker than that of the inorganic protection layer 152.

Referring to FIGS. 1, 4, 5 and 6, the pixel electrode 160 is formed on the protection layer 150, and is formed in each of the unit areas. The pixel electrode 160 is electrically connected to the TFT. The pixel electrode 160 may include an optically transparent and electrically conductive material such as indium tin oxide (ITO), indium zinc oxide (IZO), amorphous indium tin oxide (a-ITO), etc.

The pixel electrode 160 is formed on the protection layer 150 and overlaps the drain electrode DE of the TFT, and is electrically connected to the drain electrode DE through a pixel contact hole PH formed in the protection layer 150.

The sensor electrode part 170 is formed on the protection layer 150 to be spaced apart from the pixel electrode 160. For example, the sensor electrode part 170 is formed in a region of the unit areas, and is electrically connected to the first and second sensor lines 120 and 140. The sensor electrode part 170 may be formed adjacent to the pixel electrode 160 in a region of the unit area. Alternatively, the sensor electrode part 170 may be formed at an intersecting region of the first sensor line 120 and the second sensor line 140.

The sensor electrode part 170 includes a first sensor main electrode 172 electrically connected to the first sensor line 120, and a second sensor main electrode 174 electrically connected to the second sensor line 140.

Unit areas in which the sensor electrode part 170 is not formed are referred to herein as a plurality of first unit areas. Unit areas in which the sensor electrode part 170 is formed are referred to herein as a plurality of second unit areas. The pixel electrodes 160 include a plurality of first pixel electrodes 162 formed in the first unit areas and a plurality of second pixel electrodes 164 formed in the second unit areas.

To accommodate the sensor electrode part 170, a size of the first pixel electrode 162 may be different (e.g., greater) than a size of the second pixel electrode 164. Alternatively, a size of the first pixel electrode 162 may be equal to a size of the second pixel electrode 164. That is, each of the pixel electrodes 160 formed in the each unit areas is equal to each other in size. Furthermore, a width of the first direction of the second unit area may be greater than a width of the first direction of the first unit area.

Accordingly, the first width W1 of the first direction of the first pixel electrodes 162 may be smaller than the second width W2 of the first direction of the second pixel electrodes 164, and the first length L1 of the second direction of the first pixel electrodes 162 may be greater than the second length L2 of the second direction of the second pixel electrodes 164.

Referring to FIGS. 4 and 5, the first sensor line 120, the first sensor dummy electrode 126, the second sensor line 140, the second sensor dummy electrode 146, the sensor electrode part 170, etc., will be described.

As indicated above, the first sensor line 120 is formed on the first base substrate 110, and includes the first sensor main line 122 and the first sensor protrusion electrode 124.

The first sensor protrusion electrode 124 protrudes from the first sensor main line 122 toward the second direction. For example, the first sensor protrusion electrode 124 is extended in a direction that is substantially parallel with the direction of the data line DL. The first sensor protrusion electrode 124 may have a substantially square or rectangular shape when viewed from a plan view.

The first sensor dummy electrode 126 is formed on the first base substrate 110, and is spaced apart from the first sensor line 120 and the storage line SL. The first sensor dummy electrode 126 is spaced apart from the first sensor protrusion electrode 124 and extends in a direction substantially parallel with the first sensor main line 122.

The second sensor line 140 is formed on the gate insulation layer 130. The second sensor line 140 includes the second sensor main line 142 and the second sensor protrusion electrode 144.

The second sensor protrusion electrode 144 protrudes from the second sensor main line 142 in the first direction toward the first sensor protrusion electrode 124. That is, the second sensor protrusion electrode 144 is extended in a direction that is substantially parallel with the gate line GL. The first sensor protrusion electrode 124 is overlapped with the second sensor dummy electrode 146.

The second sensor dummy electrode 146 is formed on the gate insulation layer 130, and is spaced apart from the data line DL. The second sensor dummy electrode 146 is spaced apart from the second sensor protrusion electrode 144 in substantially parallel with the first sensor main line 122 and is overlapped with the first sensor protrusion electrode 124. The second sensor dummy electrode 146 may have a substantially square shape when viewed from a plan view.

A size of the first sensor dummy electrode 126 may be greater than that of the second sensor protrusion electrode 144, and a size of the second sensor dummy electrode 146 may be smaller than that of the first sensor protrusion electrode 124.

A size of the first sensor protrusion electrode 124 may be equal to that of the first sensor dummy electrode 126, and a size of the second protrusion electrode 144 may be equal to that of the second sensor dummy electrode 146.

The sensor electrode part 170 is formed on the protection layer 150. The sensor electrode part 170 includes an optically transparent and electrically conductive material. The sensor electrode part 170 includes a first sensor main electrode 172 electrically connected to the first sensor line 120, and a second sensor main electrode 174 electrically connected to the second sensor line 140.

The first sensor main electrode 172 is formed on the protection layer 150 to be overlapped with the first sensor protrusion electrode 124, and electrically connected to the first sensor protrusion electrode 124 through a first contact hole CH1 formed in the gate insulation layer 130 and protection layer 150. The first sensor main electrode 172 may have a substantially square or rectangular shape when viewed from a plan view, and may have a size that completely covers the first sensor protrusion electrode 124.

The second sensor main electrode 174 is formed on the protection layer 150 to be overlapped with the second sensor protrusion electrode 144, and electrically connected to the second sensor protrusion electrode 144 through a second contact hole CH2 formed in the protection layer 150. The second sensor main electrode 174 may have a substantially square or rectangular shape when viewed from a plan view, and may have a size that completely covers the second sensor protrusion electrode 144.

Alternatively, the first and second sensor main electrodes 172 and 174 may have a shape extended along an imaginary reference line in substantially parallel with the first direction. The first contact hole CH1 is formed in the gate insulation layer 130 and protection layer 150 at one end of the first sensor protrusion electrode 124 to expose a portion of the first sensor protrusion electrode 124. The second sensor dummy electrode 146 is disposed on the activation pattern AP and the gate insulation layer 130 corresponding to the other end of the first sensor protrusion electrode 124.

Referring to FIGS. 1, 5 and 6, the opposite substrate 200 according to the present exemplary embodiment will be described.

The opposite substrate 200 includes a second base substrate 210, a light-blocking layer 220, a color filter (not shown), an over-coating layer 230, and a common electrode 240.

The second base substrate 210 is disposed to face the first base substrate 110. The second base substrate 210 may be formed to have a plate shape. The second base substrate 210 may include glass, quartz, synthetic resin, etc.

The light-blocking layer 220 is formed on a first surface of the second base substrate 210 that faces the first base substrate 110. The light-blocking layer 220 may be formed to cover the gate line GL, the data line DL, the first sensor line 120, the second sensor line 140, the storage line SL and the TFT of the array substrate 100.

The color filter is formed on the second base substrate 210 to cover the light-blocking layer 220. For example, the color filter may have a red color filter, a green color filter and a blue color filter to be corresponding to the pixel electrodes 160, respectively.

The over-coating layer 230 is formed to cover the color filter. The over-coating layer 230 includes a sensor protrusion 232 extending toward the sensor electrode part 170. The sensor protrusion 232 protrudes at a mid-section of the over-coating layer 230 and its length is substantially the same or less than the length of the sensor electrode part 170; that is, along the first direction. A length of the first direction of the sensor protrusion 232 may be in a range of about 30 micrometers to about 60 micrometers.

Figure 7:
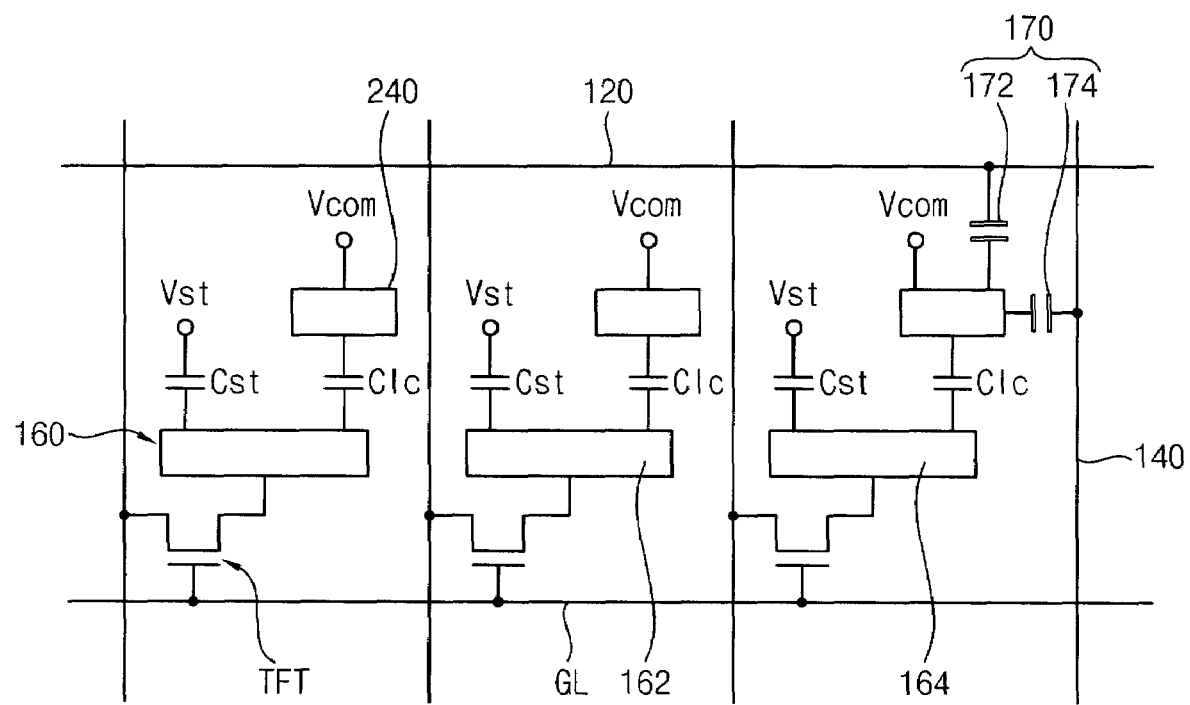
FIG. 7 is a circuit diagram showing an electrical connection relationship of the elements of FIG. 1 in an exemplary embodiment.

FIG. 7 is a circuit diagram showing an electrical connection relationship of the elements of FIG. 1.

Referring to FIGS. 1, 5, 6 and 7, an electrical connection relationship of the elements of FIG. 1 will be described.

The gate line GL and the data line DL are formed to cross each other. The TFT has a gate electrode electrically connected to the gate line GL, a source electrode electrically connected to the data line DL and a drain electrode electrically connected to the pixel electrode 160. The pixel electrode 160 includes a first pixel electrode 162 that is not adjacent to the sensor electrode part 170 and a second pixel electrode 164 that is adjacent to the sensor electrode part 170.

The pixel electrode 160 and the common electrode 240 of the opposite substrate 200 may define a liquid crystal capacitor Clc, and the pixel electrode 160 and the storage line SL may define a storage capacitor Cst. The common electrode 240 receives a common voltage Vcom, and the storage line SL receives a storage voltage Vst.

The first sensor line 120 is formed in substantially parallel with the gate line GL, and the second sensor line 140 is formed in substantially parallel with the data line DL. The first and second sensor lines 120 and 140, respectively, are electrically connected to the sensor electrode part 170 that is formed adjacent to the second pixel electrode 164. The first sensor line 120 is electrically connected to the first sensor main electrode 172, and the second sensor line 140 is electrically connected to the second sensor main electrode 174.

Thus configured, when pressure is applied to the display panel, the common electrode 240 makes contact with the first and second sensor main electrodes 172 and 174 so that the common voltage Vcom is transferred to an external sensor driving section (not shown) through the first and second sensor lines 120 and 140 to be controlled.

According to the present exemplary embodiment, the sensor electrode part 170 is formed adjacent to the pixel electrode 164 in a large axis direction of the unit area, so that an overall aperture ratio of the display panel may be increased.

By contrast, a conventional sensor electrode part is formed adjacent to the pixel electrode 160 in a short axis direction of the unit area, so that a size of the pixel electrode 160 is decreased and a total aperture ratio of the display panel is decreased. However, when the sensor electrode part 170 is formed adjacent to the pixel electrode 164 in a large axis direction of the unit area according to the exemplary embodiment described herein, a size of the pixel electrode 164 may be maximized so that a total aperture ratio of the display panel may be increased.

The second sensor dummy electrode 146 is formed on the first sensor protrusion electrode 124 and the first sensor dummy electrode 126 is formed below the second sensor protrusion electrode 144 to avoid a stepped portion in the sensor electrode part 170 that would otherwise be generated. As there is no stepped portion in the sensor electrode part 170, the common electrode 240 may simultaneously contact the first and second sensor main electrodes 172 and 174 by an external pressure. Furthermore, a contact probability of the common electrode 240 and the first and second sensor main electrodes 172 and 174 may be increased. As a result, a total size of the first and second sensor main electrodes 172 and 174 may be minimized, so that a total aperture ratio of the display panel may be increased.

According to the present invention, the sensor electrode part is formed adjacent to the pixel electrode in a large axis direction of the unit area, so that an aperture ratio of the display panel may be increased. As a result, a luminance of the display panel may be increased.

Furthermore, the second sensor dummy electrode is formed on the first sensor protrusion electrode and the first sensor dummy electrode is formed below the second sensor protrusion electrode, so that a stepped portion of the sensor electrode part may be prevented thereby allowing the common electrode to simultaneously contact the first and second sensor main electrodes. Furthermore, a contact probability of the common electrode and the first and second sensor main electrodes may be increased. As a result, a total size of the first and second sensor main electrodes may be minimized, so that a total aperture ratio of the display panel may be increased.

Although the exemplary embodiments of the present invention have been described, it is understood that the present invention should not be limited to these exemplary embodiments but various changes and modifications can be made by one ordinary skilled in the art in the spirit and scope of the present invention as hereinafter claimed.

What is claimed is:

1. An array substrate comprising:
   a gate line formed in a first direction;
   a data line formed in a second direction crossing the first direction;
   a thin-film transistor (TFT) electrically connected to the gate and data lines;
   a pixel electrode formed in a unit area defined by the gate and data lines, the pixel electrode electrically connected to the TFT;
   a first sensor line substantially parallel with the gate line;
   a second sensor line substantially parallel with the data line; and
   a sensor electrode part formed in the unit area to be electrically connected to the first and second sensor lines, the sensor electrode part disposed adjacent to the pixel electrode in a large axis direction of the unit area.

2. The array substrate of claim 1, wherein the gate line and first sensor line are formed on a base substrate and are covered by a gate insulation layer,
   the data line and second sensor line are formed on the gate insulation layer and are covered by a protection layer, and
   the pixel electrode and sensor electrode part are formed on the protection layer.

3. The array substrate of claim 2, wherein the first sensor line comprises:

a first sensor main line formed in the first direction; and a first sensor protrusion electrode that is protruded from the first sensor main line in the second direction, and the second sensor line comprises:

a second sensor main line formed in the second direction; and a second sensor protrusion electrode that is protruded from the second sensor main line in the first direction to face the first sensor protrusion electrode.

4. The array substrate of claim 3, wherein the sensor electrode part comprises:

a first sensor main electrode formed on the protection layer and overlapped with the first sensor protrusion electrode, and electrically connected to the first sensor protrusion electrode through a first contact hole formed through the protection layer; and a second sensor main electrode formed on the protection layer and overlapped with the second sensor protrusion electrode, and electrically connected to the second sensor protrusion electrode through a second contact hole formed through the protection layer.

5. The array substrate of claim 4, wherein a length of the first direction of the first and second sensor main electrodes is greater than a length of the second direction of the first and second sensor main electrodes.

6. The array substrate of claim 3, further comprising:

a first sensor dummy electrode formed on the base substrate corresponding to the second sensor protrusion electrode, the first sensor dummy electrode covered by the gate insulation layer; and a second sensor dummy electrode formed on the gate insulation layer corresponding to the first sensor protrusion electrode, the second sensor dummy electrode covered by the protection layer.

7. The array substrate of claim 6, wherein a size of the second sensor dummy electrode is smaller than a size of the first sensor protrusion electrode.

8. The array substrate of claim 7, wherein a first contact hole is formed in a gate insulation layer and a protection layer at one end of the first sensor protrusion electrode to expose a portion of the first sensor protrusion electrode, and the second sensor dummy electrode is disposed on the gate insulation layer corresponding to an opposite end of the first sensor protrusion electrode.

9. The array substrate of claim 6, wherein a size of the first sensor dummy electrode is greater than a size of the second sensor protrusion electrode.

10. The array substrate of claim 9, wherein a length of the first direction of the first sensor dummy electrode is longer than a length of the second direction of the first sensor dummy electrode.

11. The array substrate of claim 1, wherein a plurality of unit areas is formed in a matrix shape, and each of the pixel electrodes is formed in the unit areas, and the sensor electrode part is formed adjacent to the pixel electrode in a portion of the unit areas.

12. The array substrate of claim 11, wherein a size of the pixel electrodes formed in each unit area is the same.

13. The array substrate of claim 12, wherein the pixel electrodes comprise:

a plurality of first pixel electrodes formed in first unit areas, in which the sensor electrode part is not formed; and a plurality of second pixel electrodes formed in second unit areas, in which the sensor electrode part is formed, and wherein a width of the first direction of the first pixel electrodes is shorter than a width of the first direction of the second pixel electrodes, and a length of the second direction of the first pixel electrodes is longer than a length of the second direction of the second pixel electrodes.

14. A display panel comprising:

an array substrate;

an opposite substrate facing the array substrate; and a liquid crystal layer interposed between the array substrate and the opposite substrate, wherein the array substrate comprises:

a gate line formed in a first direction;

a data line formed in a second direction crossing the first direction;

a thin-film transistor (TFT) electrically connected to the gate and data lines;

a pixel electrode formed in a unit area defined by the gate and data lines, the pixel electrode electrically connected to the TFT;

a first sensor line substantially parallel with the gate line;

a second sensor line substantially parallel with the data line; and a sensor electrode part formed in the unit area to be electrically connected to the first and second sensor lines, the sensor electrode part adjacent to the pixel electrode in a large axis direction of the unit area.

15. The display panel of claim 14, wherein the first sensor line comprises:

a first sensor main line formed in the first direction, and a first sensor protrusion electrode that is protruded from the first sensor main line in the second direction, the second sensor line comprises:

a second sensor main line formed in the second direction, and a second sensor protrusion electrode that is protruded from the second sensor main line in the first direction to face the first sensor protrusion electrode, and the array substrate further comprises:

a first sensor dummy electrode formed below the second sensor protrusion electrode and overlapped with the second sensor protrusion electrode; and a second sensor dummy electrode formed on the first sensor protrusion electrode and overlapped with the first sensor protrusion electrode.

16. The display panel of claim 14, wherein the opposite substrate comprises:

an over-coating layer having a sensor protrusion protruding toward the sensor electrode part; and a common electrode formed on the over-coating layer.

17. The display panel of claim 16, wherein a length of the first direction of the sensor electrode part is greater than that of the second direction of the sensor electrode part.

18. The display panel of claim 17, wherein a length of the sensor protrusion corresponds to a length of the sensor electrode part.

19. The display panel of claim 18, wherein a length of the first direction of the sensor protrusion is about 30 micrometers to about 60 micrometers.

20. The display panel of claim 14, wherein the opposite substrate further comprises:

a light-blocking layer formed on a surface of a base substrate of the opposite substrate; and a color filter formed on the opposite substrate to cover the light-blocking layer, the color filter covered by the over-coating layer.

21. An array substrate comprising:

a gate line formed in a first direction;

a data line formed in a second direction crossing the first direction;

a thin-film transistor (TFT) electrically connected to the gate and data lines;

a pixel electrode formed in a unit area defined by the gate and data lines, the pixel electrode electrically connected to the TFT;

a first sensor line substantially parallel with the gate line;

a second sensor line substantially parallel with the data line; and a sensor electrode part formed at an intersecting region of the first and second sensor lines of the unit area, the sensor electrode part electrically connected to the first and second sensor lines.

22. The array substrate of claim 21, wherein the sensor electrode part is formed adjacent to the pixel electrode in a large axis of the unit area.

23. The array substrate of claim 22, wherein the gate line and first sensor line are formed on the base substrate and covered by a gate insulation layer, the data line and the second sensor line are formed on the gate insulation layer and covered by a protection layer, and the pixel electrode and the sensor electrode part are formed on the protection layer.

24. The array substrate of claim 23, wherein the first sensor line comprises:

a first sensor main line formed in the first direction; and a first sensor protrusion electrode that is protruded from the first sensor main line in the second direction, and the second sensor line comprises:

a second sensor main line formed in the second direction; and a second sensor protrusion electrode that is protruded from the second sensor main line in the first direction to face the first sensor protrusion electrode.

25. The method of claim 24, wherein the first sensor line comprises:

a first sensor main line formed in the first direction; and a first sensor protrusion electrode that is protruded from the first sensor main line in the second direction, and the second sensor line comprises:

a second sensor main line formed in the second direction; and a second sensor protrusion electrode that is protruded from the second sensor main line in the first direction to face the first sensor protrusion electrode.

26. The array substrate of claim 25, further comprising:

a first sensor dummy electrode formed on the base substrate and corresponding to the second sensor protrusion electrode, the first sensor dummy electrode covered by the gate insulation layer; and a second sensor dummy electrode formed on the gate insulation layer and corresponding to the first sensor protrusion electrode, the second sensor dummy electrode covered by the protection layer.

27. A display panel comprising:

an array substrate;

an opposite substrate facing the array substrate; and a liquid crystal layer interposed between the array substrate and the opposite substrate, wherein the array substrate comprises:

a gate line formed in a first direction;

a data line formed in a second direction crossing the first direction;

a thin-film transistor (TFT) electrically connected to the gate and data lines;

a pixel electrode formed in a unit area defined by the gate and data lines, the pixel electrode electrically connected to the TFT;

a first sensor line substantially parallel with the gate line;

a second sensor line substantially parallel with the data line; and a sensor electrode part formed at an intersecting region of the first and second sensor lines of the unit area, the sensor electrode part electrically connected to the first and second sensor lines.

28. The display panel of claim 27, wherein the sensor electrode part is formed adjacent to the pixel electrode in a large axis direction of the unit area.

* * * * *